United States Patent [19]

Whipp

[11] Patent Number: 5,185,032
[45] Date of Patent: Feb. 9, 1993

[54] PROCESS FOR FLUIDIZED BED DIRECT STEELMAKING

[75] Inventor: Roy H. Whipp, Miami, Fla.

[73] Assignee: Fior de Venezuela, Pto. Ordaz, Venezuela

[21] Appl. No.: 887,830

[22] Filed: May 26, 1992

[51] Int. Cl.$^5$ .............................................. C21B 1/10
[52] U.S. Cl. ...................................... 75/436; 266/172; 75/450
[58] Field of Search ................... 75/436, 444, 450; 266/172

[56] References Cited

U.S. PATENT DOCUMENTS

| | | | |
|---|---|---|---|
| 3,160,498 | 12/1964 | Olt et al. | 75/436 |
| 4,359,212 | 11/1982 | Bengtsson et al. | 266/172 |
| 4,734,128 | 3/1988 | Becerra-Novoa et al. | 75/436 |
| 4,946,498 | 8/1990 | Weber | 75/436 |

Primary Examiner—Scott Kastler
Attorney, Agent, or Firm—John-Paul J. Violette

[57] ABSTRACT

A fluidized bed direct process for reducing raw iron ore fines and directly producing an iron product comprises a process for feeding raw iron ore fines into a multi-stage reactor assembly; a process for reducing fines in fluidized beds developed by a counter-current flow of reducing gas, where the reducing gas is developed in a process for directly producing slag and iron in a gasifier/smelter assembly; a process for producing iron by further reducing and removing impurities from a part of the reduced iron ore in a gasifier/smelter assembly; a process for compacting excess reduced iron ore; and, a process for preparing reducing gas from offgas exiting said gasifier/smelter assembly; and, a process for recycling spent reducing gas exiting said reactor assembly. The processed offgas is 100% utilizable as reducing gas by balancing the reduced iron ore between the gasifier/smelter and compacting assemblies. The iron product exiting said gasifier/smelter assembly is refinable into steel with standardly available refining methods, such as those using ladle or basic oxygen furnaces for removal of impurities prior to casting.

7 Claims, 1 Drawing Sheet

PROCESS FOR FLUIDIZED BED DIRECT STEELMAKING

BACKGROUND OF THE INVENTION

1. Field of the Invention

This invention relates to a process for producing steel and more particularly to an improved process utilizing fluidized beds for producing steel directly from iron ore fines using coal and oxygen to reduce and melt the ore fines.

2. Description of the Prior Art

Steelmaking is presently carried out by two major routes. The first is the traditional coke oven/blast furnace/basic oxygen converter method which relies upon pellets, lump, or sinter ore, coking quality coal, and oxygen to produce steel. The second method utilizes the electric arc furnace to melt down and purify scrap metal and in some cases directly reduces iron by electric current to form steel.

The disadvantage of the blast furnace method is that such plants require vast capital expenditures, that high quality coking coal is required, and that atmospheric emissions are high and plants require extensive pollution control systems in order to meet present air quality standards.

The electric furnace method on the other hand relies upon electric power for the heat of fusion and cannot utilize coal. This limits its use to areas with large industrial electric grids due to the high power consumption. Additionally the cost of the energy supplied by electric is generally higher than that supplied by fossil fuel sources, such as coal. The furnaces cannot utilize iron ore directly, but must have either good quality scrap or a pre-reduced iron ore as a feedstock.

In order to perfect a more efficient steelmaking process, recent research and development has been centered upon direct steelmaking wherein raw iron ore is fed into a process which utilizes coal and oxygen to first provide a reducing gas to pre-reduce the ore and secondly to provide the heat required to melt the pre-reduced ore to make liquid iron. The iron product usually requires a subsequent refining step to reduce impurities contained in the iron and to adjust the carbon level of the steel prior to casting.

These direct steelmaking processes have important potential advantages of lower capital investment, lower atmospheric emissions and use of low quality, non-coking coal when compared to the coke oven/blast furnace plants, and the ability to use coal as a power source and to process raw iron ore directly when compared to the electric furnace process.

Some of the further disadvantages of the present direct steelmaking processes are that many require iron ore to be in the pellet, lump, or sinter form and cannot use iron ore fines directly. These coarser forms of iron are more costly than iron ore fines; and, the sinter and pellet forms require an additional processing step. Often the processes produce an excess of reducing gas which has to be burned in a separate facility as fuel gas. Since the gas has potential to be used as a reducing gas, there is an overall loss of process efficiency when it is burned, and hence an increased cost of steel.

Accordingly, there is a need for a steelmaking plant and/or process which has the known advantages of direct use of iron ore and use of lower quality coals, reduction of energy consumption, lowering of capital costs, and reduction of atmospheric emissions. Further the process should improve upon present direct steelmaking processes by using iron ore fines, and fully utilize the reducing gas produced in the process.

SUMMARY OF THE INVENTION

The present invention is directed towards a steelmaking plant assembly for pre-reducing finely divided iron ore material in fluid beds fluidized with reducing gas produced in the smelting assembly from the combustion of low grade coal and oxygen.

The steelmaking plant assembly is comprised of an ore feed assembly, a preheat assembly, a reducing reactor assembly with briquetter system, a gasifier/smelter assembly, a reducing gas preparation assembly, a recycle gas assembly, and a subsequent refining assembly which does not form part of the present invention.

Iron ore fines of less then $\frac{1}{8}''$ diameter are charged continuously to the preheat assembly by cycling pressurized lockhoppers in the ore feed assembly. The fines are heated in the preheat assembly by sensible heat of the hot reducing offgas from the uppermost reducing reactor and then enter the reducing reactor assembly where the reduction process occurs in two fluidized beds at a pressure of 5-10 atm. The ore is fluidized by hot reducing gas which is a mixture of fresh, compressed gas from the gasifier/smelter and recycle gas from the reactors. The assemblies are fixed in graduate decreasing height to facilitate gravity flow of the fines.

The reduced ore flows by pneumatic transport to a surge drum from where it can be fed to the smelter and to a briquetting machine where part of the ore is compacted into briquettes. Since the reactors operate at high pressure, the surge drum can be elevated. This permits the lowermost reactor to be situated at grade along with the gasifier/smelter rather than above it as is the case in low pressure reactor designs.

The addition of one or more briquetting machine allows the full utilization of the reducing gas to be achieved, since the reducer assembly is independent of the smelter/gasifier. The briquetter is used to compact the additional iron ore which can be reduced by the excess reducing gas which is inefficiently burned for fuel in other processes.

Hot, reduced ore from the surge drum is charged into the top of the gasifier/smelter vessel and is further reduced and heated as it falls through the upper part by gases from the gasifier. The gasifier/smelter produces heat and reducing gas from the partial oxidation of coal. The coal is charged to the gasifier by a screw feeder and oxygen is blown in through tuyeres around the periphery of the vessel. Limestone and dolemite are charged as fluxes to assist in slag production.

The reduced ore drops through the gas phase of the gasifier into the smelter where it is melted. Impurities contained in the ore float to the metal surface forming a slag layer. The hot metal and slag can be intermittently or continuously discharged through tapping points in the vessel. Slag is disposed of and the hot metal is transferred by ladle to a refining assembly for final treatment.

The reducing gas preparation assembly takes offgas from the gasifier/smelter and prepares it for use in the higher pressure reactor assembly. Gas at approximately 1000 degrees C. exiting the gasifier is cleaned, cooled, scrubbed, compressed and reheated to 850-900 degrees C. It is combined with recycle gas from the recycle gas assembly to make the total reducing gas stream.

The recycle gas is formed from the exit gas from the preheat assembly which has been cleaned, scrubbed of CO2 and H2S and has been compressed and heated to 850-900 degrees C. It is the use of a higher pressure reactor circuit and a recycle system that permits full utilization of the reducing gas produced in the gasifier.

The process can totally utilize the gas produced in the gasifier by producing a compacted reduced iron product in addition to the molten iron produced in the smelter. This briquetted reduced iron product can be utilized in other forms of steelmaking as a feedstock.

Accordingly, it is the principal object of this invention to provide a virtually closed gas reduction, direct steelmaking plant and process with iron ore fines and low grade coal input, and molten iron and compacted reduced iron output.

A further object of this invention is to provide a more efficient and economical steelmaking plant and process with reduced energy consumption.

A further object of this invention is to provide a more compact steelmaking plant and process with reduced capital investment.

A further object of this invention is to provide a steelmaking process which can utilize iron ore fines instead of sinter and pellets and low grade coal instead of high grade coking coal.

A further object of this invention is to reduce the atmospheric emissions associated with coke oven-blast furnace steelmaking processes.

A further object of this invention is to allow full utilization of the reducing gas produced in the gasifier thereby eliminating the need to burn excess gas for heat and improving the process thermal efficiency.

A further object of this invention is to reduce the plant height since the gasifier/smelter does not have to be located beneath the reducers.

BRIEF DESCRIPTION OF THE DRAWINGS

For a fuller understanding of the nature of the present invention, reference should be had to the following detailed description taken in connection with the accompanying drawing in which.

DETAILED DESCRIPTION OF THE PREFERRED EMBODIMENT

The Plant Assembly

Figure 1:
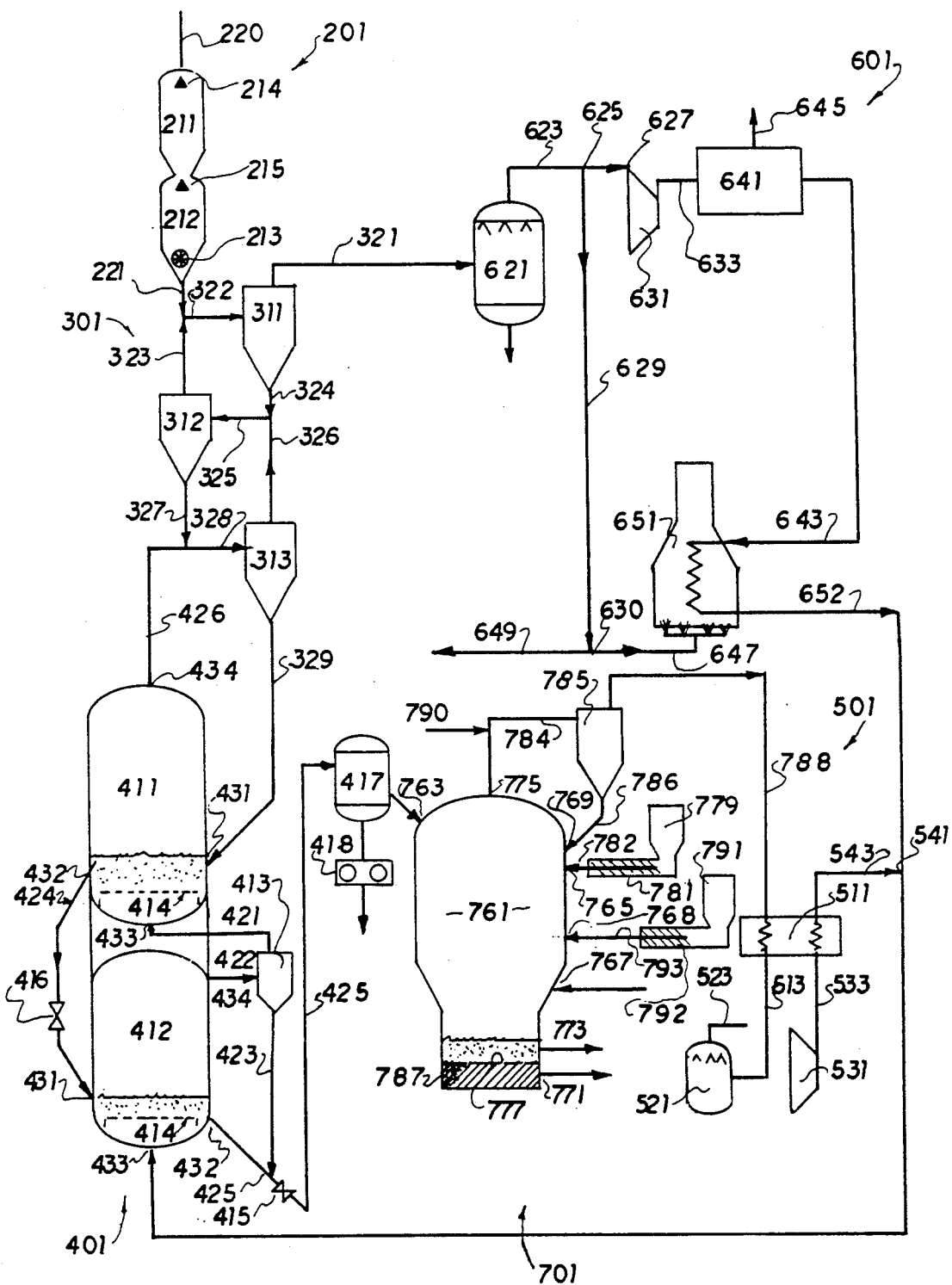
FIG. 1 is a perspective view of the overall plant including ore feed assembly, preheat reactor assembly, reducing reactor assembly, gasifier/smelter assembly, reducing gas preparation assembly and recycle gas assembly.

As shown in FIG. 1, the present invention is directed towards a direct steelmaking plant assembly, generally referred to as 11, and process for reducing finely divided iron oxide in a virtually closed, reducing gas system utilizing fluidized beds and thereafter melting the reduced material to produce iron which is subsequently refined to produce steel. Hereinafter, individual components and assemblies shall be referred to numerically and may be referenced in the drawing.

Referring to FIG. 1, the steelmaking plant assembly 11 is comprised of an ore feed assembly 201, a preheat assembly 301, a reducing reactor assembly 401, a reducing gas preparation assembly 501, a recycle gas assembly 601 and a gasifier/smelter assembly 701.

The ore feed, preheat, and reducing reactor assemblies are located in decreasing elevations so as to allow flow of the ore through the system by gravity. Due to the fact that the reactors operate at high pressure, the reduced product can be transported to the gasifier/smelter pneumatically, and therefore said vessel is located at grade level along with the lowermost reactor vessel.

The Plant Process

The present invention is directed to a plant and process for direct steelmaking utilizing a multi-stage fluid bed reactor system in which the fluidizing and reducing gas is the product of the partial oxidation of coal with oxygen. The process operates at high pressure and utilizes a recycle gas stream to improve its efficiency.

The reducing gas is comprised principally of CO and H2 but contains smaller amounts of methane, water, and carbon dioxide. In the reactors, the CO and H2 react with the iron ore fines to form CO2 and H2O. These two reaction products are removed in the recycle gas assembly to increase the reducing power of the recycle gas so that it can be recycled back into the fluid beds.

The major part of the reduced product is used in the gasifier/smelter to produce iron by fusion as a result of the heat produced from the injection of coal and oxygen into the vessel. Part of the reduced product, or that which is produced with the gas in excess of that needed to produce feed for the smelter, is compacted and passivated for use in other forms of steelmaking.

Ore Feed Assembly

Referring to FIG. 1, the lockhopper vessels 211 and 212 are conical pressure vessels constructed of carbon steel which have material inlet valves 214 and 215 and pressurizing and depressurizing lines (not shown). The upper lockhopper 211 is charged through line 220.

The upper lockhopper 211 cycles between atmospheric and reactor pressure while the lower lockhopper 212 operates continuously at reactor pressure. The discharge rate from lockhopper 212 is controlled by a variable speed star type feeder 213. The continuous flow of fines passes through line 221 to the preheat assembly 301.

Ore Feed Process

Prior to entry into the ore feed assembly, wet iron ore fines under ⅛" in diameter and with a suitable particle size distribution for use in fluid beds are dried, transported to the top of the plant where the lockhopper vessels 211 and 212 are located, and discharged into the lockhopper inlet line 220 by gravity. The upper lockhopper at this point is de-pressurized with the upper valve 214 open and the lower valve 215 closed. The upper valve 214 closes when charging is complete and the lockhopper 211 is pressurized to reactor pressure, the same pressure as in the lower lockhopper 212. The lower valve 215 opens when the lower lockhopper 212 has low level, and the charge is transferred by gravity. The valve 215 closes and the upper lockhopper 211 de-pressurizes to begin another cycle.

From the pressurized lower lockhopper 212 the dry iron ore fines are metered continuously to the preheat assembly at a rate consistent with plant capacity.

Preheat Assembly

The preheat assembly 301 consists of three refractory lined carbon steel cyclones 311, 312, and 313 with the interconnecting lines 321, 322, 323, 324, 325, 326, 327, 328, and 329.

The inlet to the first cyclone 311 is connected to the outlet of the lower ore feed lockhopper by line 221 and to the gas outlet of the next lower cyclone 312 by line 323. Lines 221 and 323 form a juncture and a new inlet line 322. The gas outlet line from the cyclone 311 is connected to the recycle gas assembly 601 by line 321. The solids outlet 324 of cyclone 311 connects with the gas outlet 326 of cyclone 313 to form a juncture at the inlet line 325 to cyclone 312. In the same manner, the solids outlet line 327 from cyclone 312 joins the gas outlet 426 from the reactor assembly 401 to form the inlet line 328 to cyclone 313. The solids outlet 329 of cyclone 313 is connected to the reducing reactor assembly 401.

Preheat Process

The function of the preheat process is to preheat the ore feed to the process while at the same time recovering the sensible heat of the reactor offgas, thereby improving the thermal efficiency of the process.

Cool, raw iron ore fines from the ore feed assembly 201 are discharged into the flow of gas exiting cyclone 312 and are heated by heat exchange with the gas. The solids are separated in cyclone 311 and drop by gravity to the inlet of cyclone 312. The cooled and cleaned gas from the cyclone 311 passes on to the recycle gas assembly 601 through line 321.

The preheated solids from cyclone 311 are further heated by the gas leaving cyclone 313 through line 326 and are separated from the gas in cyclone 312. The separated solids drop to the inlet of cyclone 313 where they are heated further by the offgas from the reactor assembly 401 which is passing through line 426. At this point the solids have attained a temperature in the range of 600 degrees C.

The hot iron ore solids are separated from the gas in cyclone 313 and pass through line 329 to the dense phase fluid bed of the uppermost reducing reactor in the reducing reactor assembly 401.

Reducing Reactor Assembly

The reducing reactor assembly 401 is comprised of two fluid bed vessels 411 and 412 mounted vertically with refractory lined connections. The vertical arrangement of the vessels allows for optimum placement of, and good access to, the external cyclones and transfer lines as compared to a staggered or stairstep arrangement.

The reactor vessels 411 and 412 are constructed of a carbon steel shell with refractory lining and are equipped with a grid 414 to distribute reducing gas uniformly across the cross section of the reactor. The gas distribution grid 414 is constructed of a thin circular heat-resistant alloy plate that is slightly smaller in diameter than the inside of the reactor. The plate is perforated with holes and equipped with inserts welded into said holes to improve gas flow distribution and mimimize sticking of reduced ore fines in the holes. The circular grid plate is sealed to the carbon steel shell by a vertical cylinder made of thin heat-resistant alloy plate and is supported centrally by a series of alloy pipes welded to the grid and to the shell.

Reactor 411 is located at the highest elevation and is referred to as the uppermost reactor whereas reactor 412 is located directly below it and is referred to as the lowermost reactor. Each of said two reducing reactors 411 and 412 include an ore inlet port 431; an ore outlet port 432; a reducing gas inlet 433; and a reducing gas outlet 434. The reducing gas inlet ports 414 are located at the bottom of the vessels under the gas distribution grids and the reducing gas outlet ports 434 are located at the top of the reactor to allow gas to pass out of the vessel.

The respective ore inlet ports 431 are located about 2-3 meters above the grid elevation for passing ore into the dense phase fluid bed. The lines connected to the inlet ports extend into the vessel and terminate about 1 meter above the grid. The respective ore outlet ports 432 are located just above the grid elevation to allow reduced ore to overflow by gravity. These outlet lines extend into the vessel and terminate about 2 meters above the grid elevation.

The two reactors are connected by an external standpipe 424 for ore transfer which is internally lined with refractory and equipped with a cycling slide valve 416.

The lower reactor 412 is equipped with an external cyclone 413 which is connected to it by line 422. The solids return line from the cyclone 423 is connected to the product discharge line 425 of the reactor. The gas outlet line 421 of the cyclone 413 is connected to the reducing gas inlet port 433 of reactor 411.

The preheated reducing gas is supplied to the reactor assembly through line 427, passes through the grid of the lowermost reactor 412 and reacts with the ore fines as it passes up through the fluid bed. The gas is cleaned of entrained fines in cyclone 413 and as is passed on to the next reactor 411 through refractory line 421. The reducing gas passes through the grid 414, reacts with the suspended iron fines, exits the reactor via line 426 and passes on the preheat assembly 301.

The reduced iron product is supplied to a surge drum 417 by a refractory lined pneumatic transport system which uses a cycling slide value 415 to control withdrawal rate. From the surge drum, part of the hot, reduced material is metered into the gasifier/smelter assembly 701 and the excess is compacted into briquettes in briquetter 418 and cooled for transport.

The resulting structure of stepwise feeders, preheaters and reactors provides a flow path for iron fines to travel downward in gravity flow through the system in series fashion, where each of said assemblies has been fixed in graduated, decreasing height from said ore feed lockhopper 211 to said lowermost reactor 412. Due to the pneumatic transport capability of a pressurized fines system, the lowermost reactor is located at grade along with the gasifier/smelter which results in lower plant height.

Reducing Reactor Process

The function of the reducing reactors 411, 412 is to remove oxygen from the iron ore fines in fluidized beds using a hot reducing gas as the fluidizing medium. There are two fluid beds in series. The ore fines flow downwards by gravity and the gas flows upward between the reactors in a counter-current manner. This counter-current contacting results in a higher utilization of the reducing gas as compared to a single bed.

The preheated ore fines are metered from the preheat assembly 301 into the first reducing reactor 411 where they are partially reduced by CO and H2 in the gas to a combination of wustite and iron at a temperature of 700-800 degrees C. and a pressure of 5-10 atm. The fluidizing gas is provided by line 421 from cyclone 413. This gas is the exit gas from the lowermost reactor and has a lower reducing potential than the reducing gas entering the lowermost reactor.

The transfer between reactors is made by an external standpipe 424 which connects the reactors. This external standpipe is equipped with a slide valve 416 to initiate solids flow during startup but the valve is left open during operation. This configuration has shown to be more reliable than internal transfer lines. The partially reduced fines fall by overflow into the upper end of the standpipe 424 inside reactor 411 and pass to reactor 412 by gravity.

The height of the dense phase fluid bed coincides with the level of the standpipe inlet or upper extremity so that reactor inventory is fixed by appropriate adjustment of the standpipe extension above the reactor grid in reactor 411. A pressure seal is maintained in the transfer line by means of a column of fluidized solids at the exit of the standpipe inside reactor 412 to prevent gas bypassing.

Gases exiting the reactor 411 carry entrained ore solids which are removed in the preheat cyclones and are returned to the bed along with the ore feed. The feeding of fresh ore through the preheat cyclones prevents buildup of material in the cyclones as has been found to occur in cyclones used in ore reduction service.

The ore fines are further reduced in reactor 412 at a temperature of 800–900 degrees C. and a pressure of 5–10 atm. The ore fines attain a metallization level of 90–92% in this bed, where metallization is defined as (% metallic iron * 100)/(% total iron). The fines are fluidized in this bed by fresh reducing gas at a temperature of 800–850 degrees C. from the recycle gas assembly 601 and the reducing gas preparation assembly 501. Some carbon is deposited on the reduced ore in this bed as a result of CO reversion.

The reduced product is transferred from the fluid bed of reactor 412 to the surge drum 417 by a pneumatic transport line 425. Fines from the reactor cyclone are also returned to the product discharge line to keep fines levels in the reactor low. Solids discharge rate from the system is controlled by slide valve 415 which maintains a constant level in reactor 41.

Ore feed rate to the plant is controlled by adjusting the feed rate until no reducing gas flows to the plant fuel system. This results in maximum production of briquetted reduced iron from the briquetter machines.

Gasifier/Smelter Assembly

The gasifier/smelter vessel 761 is a low pressure (<1 atm) vessel constructed of carbon steel and internally lined with insulation and high temperature refractory brick. The gasifier vessel 761 has inlets 763, 765, 767, 768 and 769 for reduced iron ore fines, coal, oxygen, fluxes and fines from the offgas cyclone 785, respectively. There are outlets 771, 773, 775, for molten iron metal, slag and offgas, respectively. The upper part of the vessel is of larger diameter than the lower section which contains the metal bath and slag layer.

A coal hopper 779 connects to the upper section of the vessel at port 765 by a screw type feeder 781 and line 782. Oxygen for reaction with the coal is supplied to the vessel by means of tuyeres 767 located circumferentially around the diameter. A flux hopper 791 connects to the vessel at port 768 by a screw type feeder 792 and line 793.

Offgas outlet port 775 is connected to offgas cyclone 785 by a gasifier offgas line 784, which contains water sprays 790 for partial cooling of the gas. The cyclone 785 removes entrained fines from the offgas and returns them to the gasifier through line 786 which connects to the gasifier/smelter inlet port 769. The cyclone gas outlet line 788 connects the cyclone to the reducing gas preparation assembly 501.

Standardly available refining assemblies, such as ladle or basic oxygen furnaces, may be connected to the iron outlet 771 in order to remove impurities prior to casting.

Gasifier/Smelter Process

Hot reduced iron ore fines enter the top of the gasifier/smelter vessel 761 where they are further heated and reduced as they descend through gas produced from the partial combustion of coal and oxygen. The fines begin to liquefy, drop to the slag layer where rapid mixing occurs and then pass through the slag-metal interface 777 into the molten bath due to their high density.

Coal and fluxes from storage hoppers 779 and 791 is metered by variable speed screw type feeders 781 and 792 and charged to the upper section of the vessel 761. The coal is dried, heated and converted to a reducing gas comprised principally of CO by reaction with injected oxygen and residual oxygen from the ore. The fluxes mix into the downflowing lines and drop into the bath.

The offgas, at a temperature of 1000–1200 degrees C. is cooled to 900–950 degrees C. by water sprays 790 and passes through cyclone 785 where entrained fines are removed and returned to the gasifier.

The hot metal contained in the bottom of the smelter is tapped periodically or continuously and transferred to a refining assembly (not shown) for final treatment before casting into steel. Slag is tapped periodically or continuously into slag pots and disposed of in an appropriate manner.

The iron product produced from the smelter/gasifier assembly is refinable into steel with standardly available refining assemblies, such as ladle or basic oxygen furnaces, for removal of impurities prior to casting.

Reducing Gas Preparation Assembly

The reducing gas preparation assembly 501 provides part of the reducing gas to the reactor assembly 401 and comprises a heat exchanger 511, a scrubber 521, a compressor 531, a mixing juncture 541 and connecting conduits 513, 523, 533, and 543.

Line 788 connects the gasifier/smelter assembly 701 to the exchanger 511 and passes on to scrubber 521 through line 513 providing a path through which gas from the gasifier cyclone may be cooled in the heat exchanger 511 and cleaned in scrubber 521 prior to being compressed. Line 523 connects the scrubber 521 to the low pressure inlet of compressor 531. Line 533 connects the high pressure outlet of the compressor 531 to the exchanger 511 and passes on through line 543 to juncture 541 where the line joins line 652 from the recycle gas assembly 601, providing a path through which cleaned and compressed reducing gas may be preheated, mixed with recycle gas delivered from the recycle gas preparation assembly, and delivered to reducing reactor assembly 401.

Reducing Gas Preparation Process

The reducing gas preparation assembly 501 provides the reactor assembly 401 with fresh reducing gas used to reduce the ore fines along with the recycle gas. The gas from the gasifier is the fresh reducing gas used to replenish the gas utilized in reduction and used to fire the recycle gas heater. The reducing gas is approximately one part offgas from the gasifier to two parts recycle gas.

The assembly is required to compress the gas to 5-10 atm reaction pressure. In order to compress the gas, the low pressure, fines laden gas from the gasifier offgas cyclone 785 is first cooled against clean compressed gas in the exchanger 511 and is then quenched and scrubbed of solids in scrubber 521. After exiting the scrubber, the gas can be compressed in compressor 531 and is re-heated to around 800-850 degrees C. in the exchanger against gasifier offgas. The offgas is then mixed with hot recycle gas from the recycle gas assembly prior to entering the lowermost reducing reactor 412.

Recycle Gas Assembly

The recycle gas assembly 601 cleans and recycles spent reducing gas from the preheat assembly 301 for re-use in the reactor assembly 401 and for use in the plant fuel system. It is comprised of a water cooled quench and venturi scrubber 621; a splitter juncture 625; a centrifugal compressor 631; plant fuel gas juncture 630; a gas scrubbing system 641; a gas fired furnace 651; and connecting lines 623, 627, 629, 633, 643, 645, 647, 649 and 652.

Line 623 connects the quench and venturi scrubber 621 to a splitter juncture 625. Lines 627 and 629 connect the splitter juncture to the low pressure inlet of said centrifugal compressor 631 and the plant fuel gas juncture 630, respectively, providing paths for a portion of cooled spent reducing gas to be re-pressurized and a portion to be utilized as fuel gas for the furnace.

Line 629 connects to a plant fuel gas juncture 630 and conduits 647 and 649 connect the plant fuel gas juncture to the burners of furnace 651 and the plant fuel gas supply, respectively. Conversely, fuel gas can be taken from line 523 which connects scrubber 521 with compressor 531.

Line 633 connects the high pressure outlet of the compressor 631 to the gas scrubbing system 641, providing a path through which compressed reduced gas is purified by removing $CO_2$ and $H_2S$. The removed constituents pass through line 645 for recovery.

Line 643 passes through furnace 651 and connects to juncture 541 via line 652 providing a path through which compressed recycle gas may be re-heated, mixed with fresh reducing gas from the reducing gas preparation assembly 501, and delivered to the reducing assembly 401.

The processed offgas from the gasifier/smelter assembly is 100% utilizable as reducing gas by balancing the reduced iron ore between the gasifier/smelter and compacting assemblies. This result is of significant impact since the offgas from the gasifier/smelter assembly is a high quality reducing gas, on the other hand it is a low quality fuel gas as compared to natural gas, having about one quarter of the heating capability. In previous plants and processes, said offgas is produced in such large quantities that the offgas from smelter operations has been utilized in part as fuel gas.

Recycle Gas Process

The recycle assembly is required to fully utilize the reducing gas produced in the gasifier. Processes which use a once-through reduction step do not utilize all the reducing gas in reduction and a substantial amount has to be burned as fuel, which is not thermally efficient. In addition, the use of a recycle stream dampens out the oscillations which occur in the gas flow from the gasifier. These oscillations can cause operating upsets in fluidized beds.

The spent reducing gas exiting the preheat assembly 301 still has a substantial amount of CO and H2 in it to be utilized. Due to the high levels of $CO_2$ and $H_2O$ from the reduction reactions in the reactor system, the reducing potential of the gas is low and the $CO_2$ and $H_2O$ have to be removed in order to reuse the gas.

The $H_2O$ is removed to a low level (0.7-1.5%) by quenching the gas with water in scrubber 621. This venturi type scrubber also removes entrained fines from the gas. Part of the gas is sent to the reheat furnace as fuel. The rest is recycled by compressing it in recycle compressor 631 and then removing $CO_2$ and $H_2S$ in a gas scrubber. When the plant is operating properly there should be no flow through line 649. There will be flow to plant fuel gas via line 649 in the case that additional ore is not fed to the reactors for compacting into direct reduced iron.

The gas exiting the scrubber 641, now low in $H_2O$ and $CO_2$, is heated to 800-850 degrees C. in furnace 651 using some reducing gas as fuel. The hot gas from the furnace 651 is combined with gas from the reducing gas preparation assembly 501 and sent on to the reactor assembly 401.

It is therefore to be understood that the following claims are intended to cover all of the generic and specific features of the present invention herein described, and all statements of the scope of the invention which as a matter of language, might be said to fall there between.

Now that the invention has been described,

What is claimed is:

1. A process for direct steelmaking from raw iron ore fines under ⅛" diameter in a steelmaking plant including an ore feed assembly, a multi-stage fluid bed reactor assembly including a preheat assembly, a gasifier/smelter assembly, a reducing gas preparation assembly, and a recycle gas assembly, comprising:
   a) continuously charging raw iron ore fines at a predetermined ore feed rate into said preheat assembly by cycling pressurized lockhoppers in said ore feed assembly;
   b) heating said fines in said preheat assembly by sensible heat of hot reducing offgas exiting said reactor assembly;
   c) maintaining said reactor assembly in a pressurized state of at least 5 atmospheres;
   d) fluidizing said fines in said reactor assembly and producing a 90% minimum metallized product by
   i) developing a pair of stacked, pressurized beds of iron ore by utilizing gravity to pour iron ore fines downward into an upper vessel creating an upper bed and passing overflow iron ore fines to a lower vessel creating a lower bed; and,
   ii) fluidizing said beds by passing a product reducing gas upward through each of said beds from said lower bed to said upper bed; and
   iii) removing oxygen from said fines by continuously passing said preheated ore charge by overflow through each of said beds from said upper bed to said lower bed gravimetrically;
   e) directing reduced iron ore fines by pneumatic transport to a surge drum for feeding into a smelter and a briquetting machine for compacting into briquettes, either separately or concurrently;

f) charging part of the hot, reduced ore from the surge drum into the top of the gasifier/smelter vessel;

g) further reducing and heating said hot, reduced ore as the ore fall through exiting gases flowing upward through the upper part of the gasifier/smelter vessel where heat and reducing gas are produced from the partial oxidation of coal and the reduction of the remaining oxides in the ore;

h) charging coal and fluxes to the gasifier by screw feeders and blowing oxygen in through tuyeres around the periphery of the gasifier/smelter vessel;

i) dropping the melted, reduced ore into the bath of the smelter where impurities contained in the ore float to the metal surface forming a slag layer;

j) intermittently or continuously discharging the hot metal and slag through tapping points in the vessel;

k) separating the hot metal from the slag and transferring the hot metal to a refining assembly for final treatment.

l) compacting part of the reduced iron ore fines to a product which is passive and easy to store and transport.

2. A process for direct steelmaking as in claim 1, said process for direct steelmaking including an ore feed cycling process including a) charging iron ore fines under $\frac{1}{2}$" to an upper lockhopper at atmospheric pressure, where the ore inlet of the upper lockhopper is open and the ore outlet is closed;

b) upon completion of charging the upper lockhopper, the ore inlet is closed and the upper lockhopper is pressurized to reactor pressure;

c) continuously discharging iron ore fines from said lower lockhopper into said preheat assembly;

d) when the level of ore is low in said lower lockhopper which is maintained at reactor pressure, opening the ore outlet of the pressurized upper lockhopper;

e) upon completion of charging the lower lockhopper, closing the ore outlet of the upper lockhopper, de-pressurizing the upper lockhopper, and opening the ore inlet of the upper lockhopper for re-filling with iron ore fines;

f) re-commencing steps a, b, d, and e.

3. A process for direct steelmaking as in claim 1, said process for direct steelmaking including a preheat process, said preheat process including a) heating downward flowing iron ore fines from said ore feed assembly with upward flowing gases exiting a middle cyclone;

b) separating fines from gases in an upper cyclone;

c) discharging fines downward from said upper cyclone and heating by mixing with upward flowing gases exiting a lower cyclone;

d) separating fines from gases in said middle cyclone;

e) discharging fines downward from said middle cyclone and heating by mixing with upward flowing gases and entrained fines exiting said reducing reactor assembly;

f) separating fines from gases in said lower cyclone; and, g) discharging fines into said reducing reactor assembly.

4. A process for direct steelmaking as in claim 1, said process for direct steelmaking including a reducing reactor process, said reducing reactor process including a) developing an upper and lower fluid bed in an upper and lower fluid bed vessel by i) depositing downward flowing fines from said preheat process into said upper fluid bed vessel;

ii) directing overflow fines from said upper fluid bed vessel into said lower fluid bed vessel;

iii) providing an upflow of hot reducing gas through the bottom of the lower vessel, out the top of the lower vessel, through the bottom of the upper vessel, and out the top of the upper vessel, where the temperature and rate of flow of said hot reducing gas is pre-determined to fluidize and reduce said fines;

iv) directing fines with respect to gas in a counter-ore current relation in order to facilitate higher reducing activity; and, b) transferring reduced fines from said vessels to an elevated surge drum via pneumatic transport by utilizing the vessel pressurization for controlled delivery to a gasifier/smelter assembly and a briquetting system, either separately or concurrently.

5. A process for direct steelmaking as in claim 1, said process for direct steelmaking including a gasifier/smelter process, said gasifier/smelter process comprising a) charging said gasifier/smelter vessel with hot reduced ore fines from said reducing reactor assembly;

b) reducing and liquefying said fines by dropping said fines through gas produced from partial combustion of coal and oxygen, and into a slag layer;

c) mixing said liquid ore in said slag layer and passing said liquid ore downward to a liquefied iron layer;

d) combusting coal in said gasifier/smelter vessel with oxygen, both injected and residual from said ore fines, and producing reducing gas comprised of CO and H2;

e) injecting fluxes to assist in slag formation required for removal of impurities;

f) separating entrained fines from exiting offgas, re-directing de-entrained fines into said gasifier/smelter vessel, and utilizing said offgas as a source for said reducing gas preparation assembly;

g) periodically or continuously tapping iron from said liquefied iron layer for transferring to a refining assembly; and, h) separately tapping slag from said slag layer.

6. A process for direct steelmaking as in claim 1, said process for direct steelmaking including a reducing gas preparation process, said reducing gas preparation process including a) cooling heated offgas from said gasifier/smelter assembly with fresh reducing gas and correspondingly heating said fresh reducing gas; and, b) producing fresh reducing gas by scrubbing and compressing cooled offgas.

7. A process for direct steelmaking as in claim 1, said process for direct steelmaking including a recycle gas process, said recycle gas process including a) removing CO2 and H2O from offgas exiting said preheat assembly and developing recycle gas by i) quenching said offgas with water and removing entrained fines in a scrubber;

ii) delivering a portion of quenched offgas for use as fuel to a furnace and other components of the steelmaking plant;

iii) compressing the balance of said quenched off-gas;

iv) removing CO2 and H2S in a scrubber;

v) heating said gas in said furnace; and, vi) delivering said gas in said reducing reactor assembly as recycle gas.

* * * * *